United States Patent [19]

Quaintance

[11] Patent Number: 4,873,450
[45] Date of Patent: Oct. 10, 1989

[54] ELECTRICAL GENERATING APPARATUS AND METHOD

[76] Inventor: James Quaintance, 303 Charlotte Dr., Port Lavaca, Tex. 77979

[21] Appl. No.: 770,253

[22] Filed: Aug. 28, 1985

Related U.S. Application Data

[63] Continuation of Ser. No. 637,483, Aug. 3, 1984, abandoned.

[51] Int. Cl.$^4$ ................................................. F03B 1/02
[52] U.S. Cl. ....................................................... 290/52
[58] Field of Search ............................. 290/43, 52, 54; 415/202; 416/197 R, 197 A, 197 B

[56] References Cited

U.S. PATENT DOCUMENTS

| | | | |
|---|---|---|---|
| 515,674 | 2/1894 | Guldhaug | 415/202 X |
| 2,756,962 | 7/1956 | Joyce | 415/202 X |
| 4,392,062 | 7/1983 | Beruig | 290/54 |
| 4,739,182 | 4/1988 | Kenderi | 290/54 |

Primary Examiner—William M. Shoop Jr.
Assistant Examiner—W. E. Duncanson, Jr.

[57] ABSTRACT

Apparatus and method for generating electricity cheaply, efficiently, and with no resulting air or water pollutants. The device is pressurized so that water is forced out of the operating section of the device and up a small tube into a head tank. Once the device is in this position, a water pump in the head tank is activated thereby forcing water downward which, in conjunction with gravity, applies sufficient force to a water wheel located at the end of a large tube to turn an electrical generating device. Since the system is pressurized and sealed, water introduced into the operating section is forced continuously into the water side of the device back up the small tube and into the head tank for recycling.

7 Claims, 4 Drawing Sheets 4,873,450

ELECTRICAL GENERATING APPARATUS AND METHOD

This is a continuation of application Ser. No. 637,483, filed Aug. 3, 1984, now abandoned.

BACKGROUND OF THE INVENTION

1. Field of the Invention

This invention pertains to a device which is designed to generate electricity through use of water power. The gist of the invention is a tank which has a base portion which is divided substantially in two from the top almost to the bottom. On one side of the division is located a water wheel. On the other side with a connecting passage at the bottom of the divider is water. The base portion of the tank has a small diameter pipe extending from the top of the base to a head tank. The head tank includes a water pump connected through a valve to a downwardly connecting larger pipe. The larger pipe is attached to the base portion of the tank directly over the water wheel. In operation, the tank is pressurized so that air drives the water out of the side with the water wheel and hence upward into the small pipe and filling the head tank. Once the tank is placed in this position the water pump is activated thereby driving water from the head tank through a valve into the evacuated bottom portion of the base in which the water wheel is located. The water striking the water wheel turns the water wheel and in return turns an electrical generating device. The fact that the device is pressurized so that the water continues to rise and fill the head tank as the pump pumps water downwardly in conjunction with the force of gravity on the water wheel enables the device to generate electricity cheaply.

2. Description of the Prior Art

While there are numerous types and designs of electrical generating devices, to the best of this inventor's knowledge, there has never been an invention such as this designed to cheaply efficiently utilize water and gravity to generate electricity. In this inventor's experience, every device has been designed to attempt to utilize water and gravity has failed in this attempt in that they utilize an expensive additional source of energy to power them, energy had to be transported to the location of the device, the location of the source of energy was limited or was responsible for air pollution or the cost of construction and maintenance of the device was prohibitive.

SUMMARY OF THE INVENTION

This invention consists of a base portion of a tank in which a water wheel is located on one side of a divider which divides the base portion in two from the top almost to the bottom. One side of the top of the base portion is connected to a head tank by a small diameter pipe. The head tank contains a water pump and valve which directs water from the head tank down into a larger diameter pipe which is ultimately connected to the top of the base portion directly under which is located the water wheel. In operation, the device is pressurized so that water within the base portion is driven out of the side of the base portion with the water wheel and up the smaller diameter pipe, ultimately filling the head tank. Once the device is placed in this position, the water pump in the head tank is utilized to drive water from the head tank down onto the water wheel. The water wheel, in turn, drives an electrical generator thereby producing electricity. The pressurized portion of the tank continues to ensure that water is introduced into the head tank and the amount of electricity generated far out weighs the amount utilized by the water pump.

The characteristics that further describe this device are that water and gravity a inexpensive sources of energy which do not have to be transported large distances. In fact, these items are available throughout the world in an unlimited supply, for all practical purposes. Additionally, the operation of the device does not add to pollution of the environment and it is inexpensive to build and maintain.

The object of the invention is to provide a cheap, maintenance free, source of energy utilizing readily available energy sources.

BRIEF DESCRIPTION OF THE DRAWINGS

For a description of the construction and operation of the device of this invention, reference is made to the attached drawings and identical reference characters will be utilized to refer to identical or equivalent structures throughout the various views in the following detailed description.

DETAILED DESCRIPTION

Figure 1:
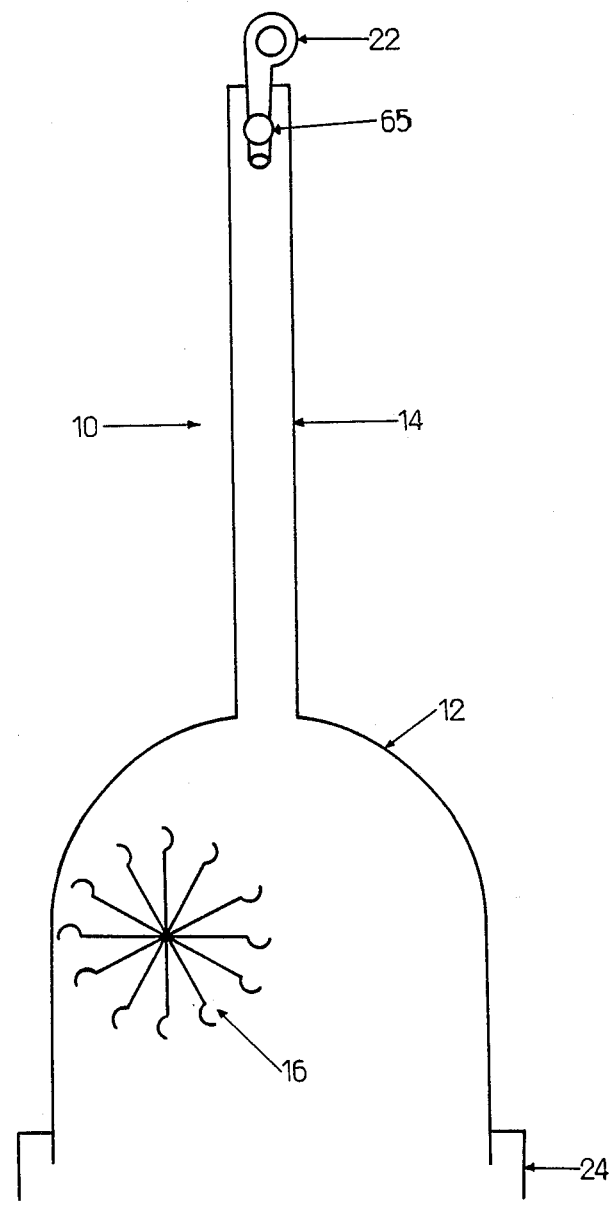
FIG. 1 is a side cut away view of the apparatus detailing the interior structures.
Figure 2:
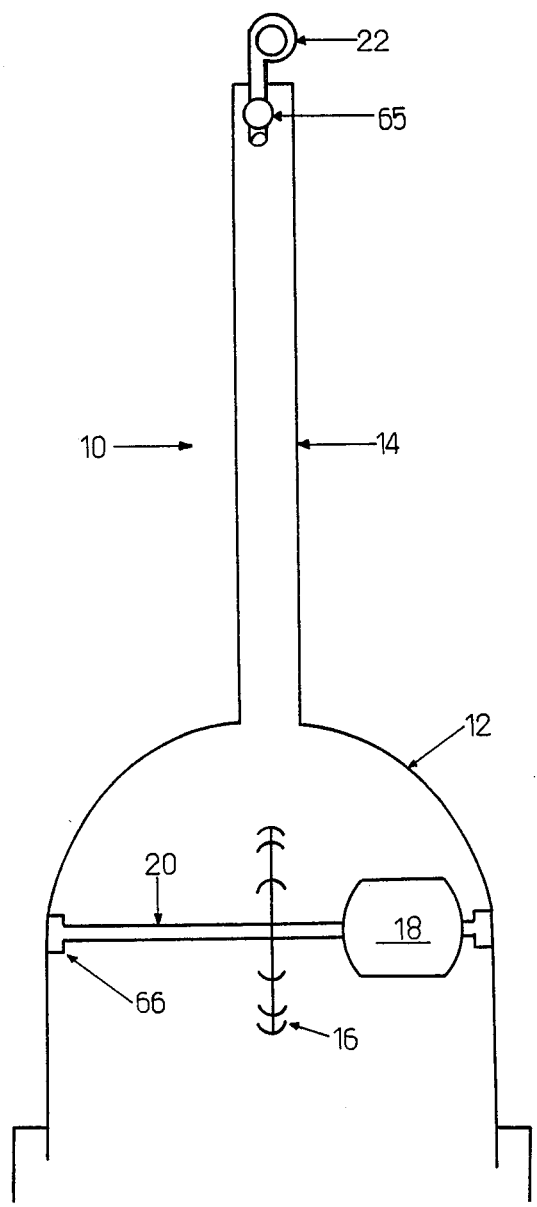
FIG. 2 is another side cut away view of the apparatus from the opposite side.

Referring to FIGS. 1 and 2, 10 denotes the invention itself consisting of a base portion 12 made of a metalic material, such as aluminum or steel, and a downwardly extending divider 14 which connects with top 16 of said base portion 12 but does not connect with the bottom 18 of said base portion 12 therby leaving gap 20 near the bottom of the said base portion 12. The operating side 22 of said base portion 12 contains water wheel 24 connected by connecting means 26 to electrical generating device 28 located above and behind said water wheel 24 in operating section 22 of said base portion 12. Opposite said operating section 22 is fluid containing section 30 which is connected through top section 16 of said base portion 12 with upwardly extending small tube 32. In turn, upwardly extending small tube 32 is connected to head tank portion 34 of device 10. Said head tank 34 contains water pump 36 connected to valve 38 which is in turn connected with downwardly extending large tube 40.

Figure 3:
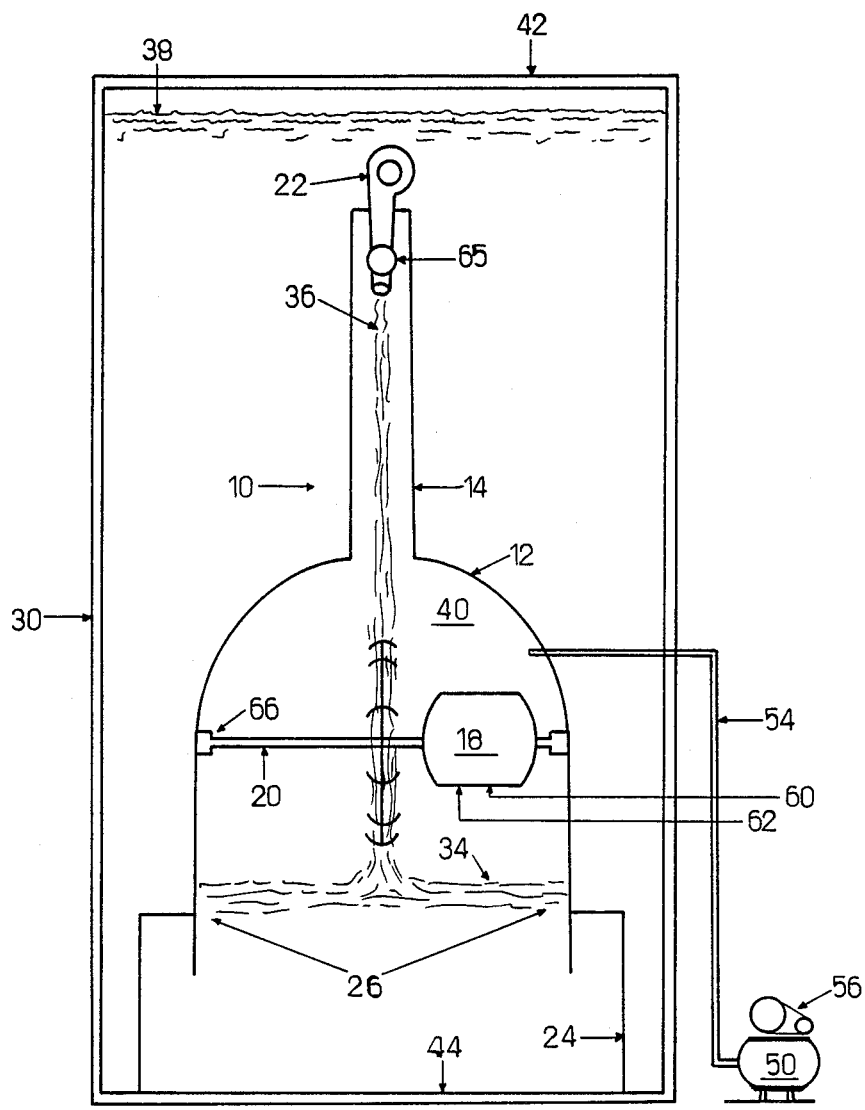
FIG. 3 is a side view detailing the exterior of the apparatus.
Figure 4:
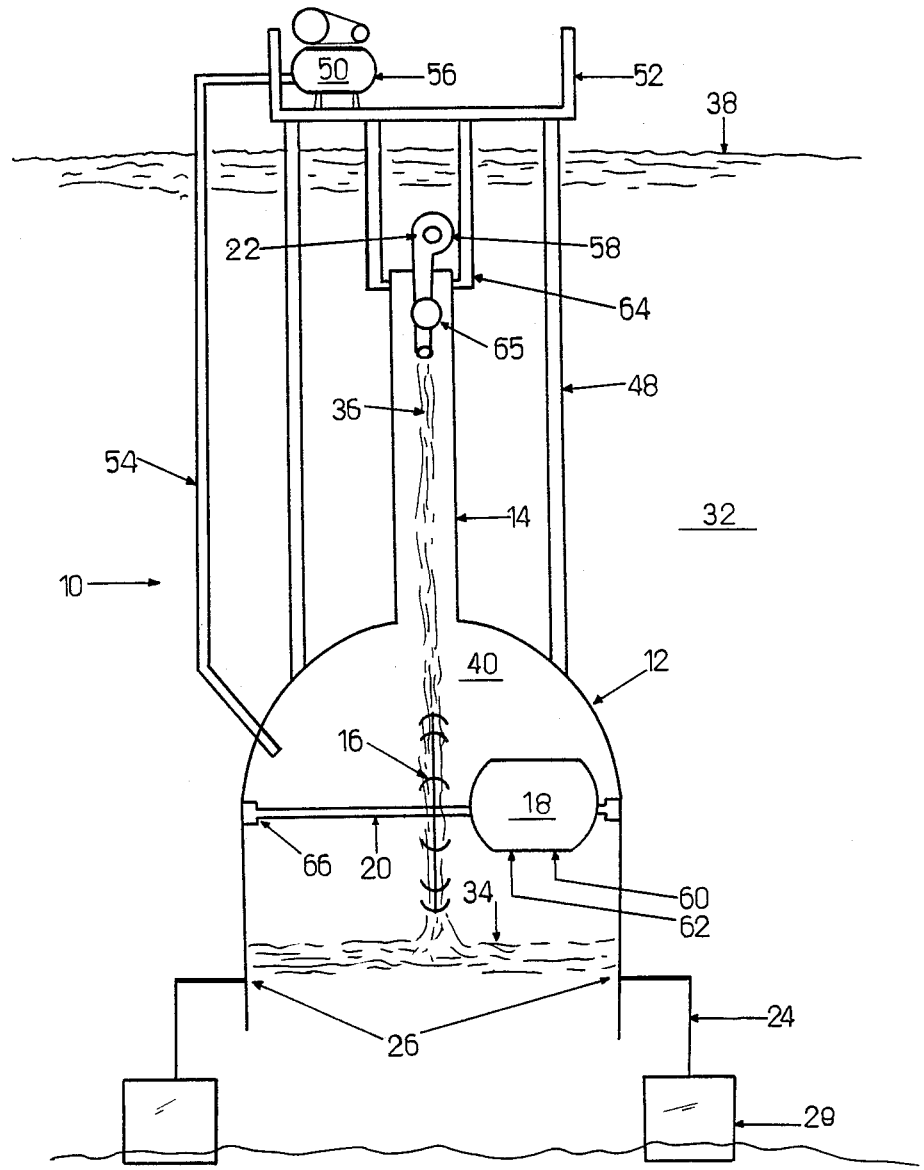

Referring to FIG. 3 of apparatus 10, in said base portion 12 is constructed with viewing glass 42 and air pressure gage 44.

In use, the apparatus 10, is pressurized with air so that water is driven out of the operating section 22 and completely fills the fluid section 30 as well as upwardly extending small tube 32 and head tank 34. Once apparatus 10 is in this position, water pump 36 is activated directing a stream of water through valve 38 and downwardly from said head tank 34 through the downwardly extending large tube 40 and onto water wheel 24. The force of gravity and the force of the pump driven water turns water wheel 24 which in turns moves connecting means 26 which ultimately turns the electrical generating device 28. The pressurized apparatus remains pressurized and as a result, water introduced into operating section 22 is forced down and into fluid section 30 up through small tube 32 and into head tank 34 for recycling and reuse.

Thus, according to this invention, electricity may be generated cheaply and efficiently without pollution by utilization of the above-described apparatus. The system, once pressurized, is operated by the combination of gravity and pumped water to turn a water wheel which in turn is attached to an electrical generating device which produces electricity in quantities in excess of that required to operate the water pump.

While the invention has been described in connection with the preferred embodiment, it is not intended to limit the invention to the particular form set forth, but, on the contrary, it is intended to cover alternatives, modifications, and equivalents as may be included within the spirit and scope of the invention as defined by the appended claims.

What is claimed is:

1. An electrical generating apparatus in a working environment of a tank comprising:
   an electrical generating device housed in a container called the gravity-motor which is totally submerged below the surface of the working fluid such as a liquid contained in a tank with a pressurized gaseous atmosphere gravity accelerating fluid chamber called the passage;
   an anchored, water-tight rotor chamber which contains a rotor axle, rotor, and generator;
   a submersible centrifugal pump located in the uppermost part of the passage whose discharge is directed vertically downward onto rotor vanes;
   a valve connected to the discharge side of the pump;
   an external electrical power source to supply the submersible centrifugal pump, air compressor, and generator;
   and an opening in the bottom of the gravity-motor to permit transmission of working fluid flowing through the gravity-motor to disperse into the main body of working fluid in the tank.

2. An electrical generating apparatus as recited in claim 1, wherein electrical power or mechcanial work transmutes energy by an output torque from a shaft utilizing gravity as the prime source of energy to acelerate the working fluid of a turbine.

3. An electrical generating apparatus as recited in claim 1, wherein said means for temporarily catching a working fluid in said rotor includes a rotor with vanes located in said rotor chamber directly beneath said passage and a connection between said rotor and an electrical generator.

4. A working fluid as recited in claim 1, wherein said working fluid is in a liquid state.

5. An electrical generating apparatus described in a working environment of a natural body of water.
   The apparatus is an electrical generating device housed in a container called the gravity-motor which is totally submerged below the surface of a natural body of water (working fluid) comprising a pressurized gaseous atmosphere gravity acelerating fluid chamber called the passage;
   an anchored or floating rotor chamber which contains a rotor axle, rotor and generator (in a watertight housing);
   a means to pressurize the gravity-motor by an air compressor;
   a platform above the water surface securely attached to the gravity-motor by braces;
   a submersible centrifugal pump located in the upper most part of the passage whose discharge is directed vertically downward on the rotor vanes;
   an external electrical power source (both alternating current and direct current) to supply the centrifugal pump, air compressor and generator;
   an opening in the bottom of gravity-motor permitting transmission of working fluid flowing through the gravity-motor to disperse into main body of working fluid.

6. An electrical generating apparatus as recited in claim 5, wherein electrical power or mechanical work transmites energy by an output torque from a shaft utilizing gravity as the prime source of energy to acelerate the working of a turbine.

7. An electrical generating apparatus as recited in claim 5, wherein said means for temporarily catching a working fluid in said rotor includes a rotor with vanes located in said rotor chamber directly beneath said passage and a connection between said rotor and an electrical generator.

* * * * *